United States Patent
Lin et al.

(10) Patent No.: US 12,450,441 B2
(45) Date of Patent: *Oct. 21, 2025

(54) METHODS AND SYSTEMS FOR GENERATING A SEMANTIC COMPUTATION GRAPH FOR UNDERSTANDING AND GROUNDING REFERRING EXPRESSIONS

(71) Applicant: Adobe Inc., San Jose, CA (US)

(72) Inventors: Zhe Lin, Fremont, CA (US); Walter W. Chang, San Jose, CA (US); Scott Cohen, Sunnyvale, CA (US); Khoi Viet Pham, Hyattsville, MD (US); Jonathan Brandt, Santa Cruz, CA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/182,068

(22) Filed: Mar. 10, 2023

(65) Prior Publication Data

US 2023/0214600 A1 Jul. 6, 2023

Related U.S. Application Data

(63) Continuation of application No. 16/775,697, filed on Jan. 29, 2020, now Pat. No. 11,636,270.

(51) Int. Cl.
*G06F 40/30* (2020.01)
*G06F 16/532* (2019.01)
(Continued)

(52) U.S. Cl.
CPC ............ *G06F 40/30* (2020.01); *G06F 16/532* (2019.01); *G06F 16/55* (2019.01); *G06F 40/205* (2020.01);
(Continued)

(58) Field of Classification Search
CPC ...... G06F 40/284; G06F 40/295; G06F 40/30; G06F 40/205; G06F 16/532; G06F 16/55;
(Continued)

(56) References Cited

U.S. PATENT DOCUMENTS 7,574,652 B2 * 8/2009 Lennon ................ G06F 16/242
715/248
10,282,389 B2 5/2019 Liang et al.
(Continued)

FOREIGN PATENT DOCUMENTS

WO 2019/050968 A1 3/2019

OTHER PUBLICATIONS

Cirik, V., et al., "Using Syntax To Ground Referring Expressions in Natural Images", In Thirty-Second AAAI Conference on Artificial Intelligence, pp. 1-10 (2018).
(Continued)

*Primary Examiner* — Vijay B Chawan
(74) *Attorney, Agent, or Firm* — Shook, Hardy & Bacon L.L.P.

(57) ABSTRACT

Embodiments of the present invention provide systems, methods, and non-transitory computer storage media for parsing a given input referring expression into a parse structure and generating a semantic computation graph to identify semantic relationships among and between objects. At a high level, when embodiments of the preset invention receive a referring expression, a parse tree is created and mapped into a hierarchical subject, predicate, object graph structure that labeled noun objects in the referring expression, the attributes of the labeled noun objects, and predicate relationships (e.g., verb actions or spatial propositions) between the labeled objects. Embodiments of the present invention then transform the subject, predicate, object graph structure into a semantic computation graph that may be
(Continued)

recursively traversed and interpreted to determine how noun objects, their attributes and modifiers, and interrelationships are provided to downstream image editing, searching, or caption indexing tasks.

20 Claims, 9 Drawing Sheets

(51) Int. Cl.
  *G06F 16/55* (2019.01)
  *G06F 40/205* (2020.01)
  *G06F 40/295* (2020.01)
  *G06N 5/02* (2023.01)
  *G06N 5/04* (2023.01)
  *G06N 20/00* (2019.01)
  *G06V 10/40* (2022.01)
  *G06V 30/10* (2022.01)

(52) U.S. Cl.
  CPC ............ *G06F 40/295* (2020.01); *G06N 5/02* (2013.01); *G06N 5/04* (2013.01); *G06N 20/00* (2019.01); *G06V 10/40* (2022.01); *G06V 30/10* (2022.01)

(58) Field of Classification Search
  CPC .... G06F 16/248; G06F 16/3329; G06F 16/58; G06F 16/951; G06F 16/242; G06F 16/243; G06F 16/36; G06F 16/434; G06F 16/538
  USPC .......................................................... 704/9
  See application file for complete search history.

(56) References Cited

U.S. PATENT DOCUMENTS

| | | | | |
|---|---|---|---|---|
| 11,263,277 | B1* | 3/2022 | Podgorny | G06F 16/3329 |
| 11,636,270 | B2* | 4/2023 | Lin | G06F 16/55 |
| | | | | 704/9 |
| 2007/0016863 | A1* | 1/2007 | Qu | G06F 16/36 |
| | | | | 715/702 |
| 2010/0070448 | A1* | 3/2010 | Omoigui | H10F 39/1825 |
| | | | | 706/55 |
| 2012/0166373 | A1 | 6/2012 | Sweeney et al. | |
| 2013/0330008 | A1 | 12/2013 | Zadeh | |
| 2014/0142922 | A1* | 5/2014 | Liang | G06F 40/295 |
| | | | | 704/9 |
| 2014/0188844 | A1* | 7/2014 | Kogan | G06F 16/538 |
| | | | | 707/722 |
| 2014/0201126 | A1* | 7/2014 | Zadeh | A61B 5/165 |
| | | | | 706/52 |
| 2015/0169758 | A1 | 6/2015 | Assom et al. | |
| 2016/0078059 | A1* | 3/2016 | Kang | G06V 20/64 |
| | | | | 382/305 |
| 2016/0378861 | A1 | 12/2016 | Eledath et al. | |
| 2017/0262412 | A1 | 9/2017 | Liang et al. | |
| 2017/0329760 | A1* | 11/2017 | Rachevsky | G06F 40/30 |
| 2018/0011611 | A1* | 1/2018 | Pagaime da Silva | |
| | | | | G06F 16/248 |
| 2018/0204111 | A1* | 7/2018 | Zadeh | G06V 10/764 |
| 2018/0225032 | A1* | 8/2018 | Jones | G06F 16/434 |
| 2018/0329879 | A1* | 11/2018 | Galitsky | G06N 3/08 |
| 2019/0318405 | A1* | 10/2019 | Hu | G06V 20/00 |
| 2020/0175303 | A1* | 6/2020 | Bhat | H04L 51/10 |
| 2021/0232770 | A1* | 7/2021 | Lin | G06V 10/40 |
| 2023/0214600 | A1* | 7/2023 | Lin | G06N 20/00 |
| | | | | 704/9 |

OTHER PUBLICATIONS

Elhoseiny, M., et al., "Automatic Annotation of Structured Facts in Images", arXiv preprint arXiv:1604.00466, pp. 1-19 (Apr. 8, 2016).
Yu, L., et al., "MAttNet: Modular Attention Network for Referring Expression Comprehension", In Proceedings of the IEEE Conference on Computer Vision and Pattern Recognition, pp. 1307-1315 (2018).

* cited by examiner

```
Intersect
  Locate
    Intersect
      Locate
        noun-expr: my girlfriend
        noun-hypernym
          [0]
            [0]: girlfriend.n.01
            [1]: woman.n.01
            [2]: adult.n.01
            [3]: person.n.01
      Relate
        Predicate
          relationships
            [0]
              value: walking/VBG
              type: action
        Locate
          noun-expr: our corgi
          noun-hypernym
            [0]
              [0]: corgi.n.01
              [1]: dog.n.01
              [2]: canine.n.02
              [3]: carnivore.n.01
              [4]: animal.n.01
  Relate
    Predicate
      relationships
        [0]
          value: wearing/VBG
          type: action
    Locate
      modifiers
        [0]
          value: red
          type: Color
          HSV
        [1]
          value: grey
          type: Color
          HSV
        [2]
      noun-expr: pullover
      noun-hypernym
        [0]
          [0]: pullover.n.01
          [1]: sweater.n.01
          [2]: garment.n.01
          [3]: clothing.n.01
          [4]: consumer_goods.n.01
```

FIG. 6

METHODS AND SYSTEMS FOR GENERATING A SEMANTIC COMPUTATION GRAPH FOR UNDERSTANDING AND GROUNDING REFERRING EXPRESSIONS

CROSS-REFERENCE TO RELATED APPLICATIONS

This application is a continuation of U.S. application Ser. No. 16/755,697, filed on Jan. 29, 2020. The entire contents of which are incorporated by reference herein in their entirety.

BACKGROUND

Today, natural language processing (NLP) is a fundamental element of software. Search engines that rely on NLP are built into a wide-range of applications to perform various tasks. For example, a common feature of photo storage applications is the ability to search for photos based on user input describing content in the photo. As applications become more interactive, understanding how humans express information is critical for providing the best user experience. This requires computers to discern the meaning of complex sentences and phrases. By understanding and representing natural language in a structured manner, intelligent systems can use NLP to assist users with interactive tasks and provide robust searching and labeling functionality.

SUMMARY

Embodiments of the present invention relate to, among other things, parsing a referring expression and generating a semantic computation graph that identifies image objects, attributes, and object interrelationships in the referring expression. Accepting natural language as input, embodiments of the present invention parse the input to generate a hierarchical (subject, predicate, object) structure that labels noun objects in the input, the attributes of the objects, and predicate relationships (e.g., verb actions or spatial propositions) between objects. Given a parse structure, embodiments of the present invention create a semantic computation graph that identifies all possible image objects, their attributes, and interrelationships between other objects in the input. The generated semantic computation graph can then be: 1) associated or grounded to object information from a computer vision system to form a joint understanding of image editing requests, 2) used for query intention modeling to represent the referring expression in an image query, and 3) to extract salient information from image captions to create rich semantic indexes for image search systems.

At a high level, when embodiments of the present invention receive a referring expression as input, a parse tree is created and mapped into a hierarchical subject, predicate, object (<S, P, O>) graph structure. Embodiments of the present invention transform the <S, P, O> graph into the final computation graph that is returned to a client application. The semantic computation graph may be recursively traversed so that each node (e.g., INTERSECT, LOCATE, CONJUNCTION, DISJUNCTION, and RELATE nodes) can be interpreted to determine the correct object edit request, query, or computer vision (CV) grounding operation. For INTERSECT nodes, all of the noun objects for each complex Noun Phrase (NP) may need to be located (specified in children LOCATE nodes). This allows the client application processing the semantic computation graph to determine how these noun objects, their attributes and modifiers, and interrelationships are provided to the downstream editing, searching, or caption indexing task.

To resolve key problems of conventional methods, including misidentifying named entities when predicting a correct parse structure and subsequent computation graph for the tasks, embodiments of the present invention employ object ontologies to understand image objects (e.g., that a "hiker" is a kind of "person") and also detect and classify object attributes (e.g., that "tan" is a color or "wooden" is a material). To improve the accuracy of the mappings between language objects and vision labels, embodiments of the present invention employ a grounding ontology that ensures consistent semantic mapping between language objects and vision labels. As a result, embodiments of the present invention significantly improve language parsing tasks that increase parser coverage of an input expression by capturing the semantic relationships between objects (e.g., a person petting a dog, or that a hiker is in the woods).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 6 is an exemplary is an exemplary illustration of a generated semantic computation graph for a given referring expression that includes hypernym expansions, in accordance with embodiments of the present invention;

DETAILED DESCRIPTION

Figure 1:
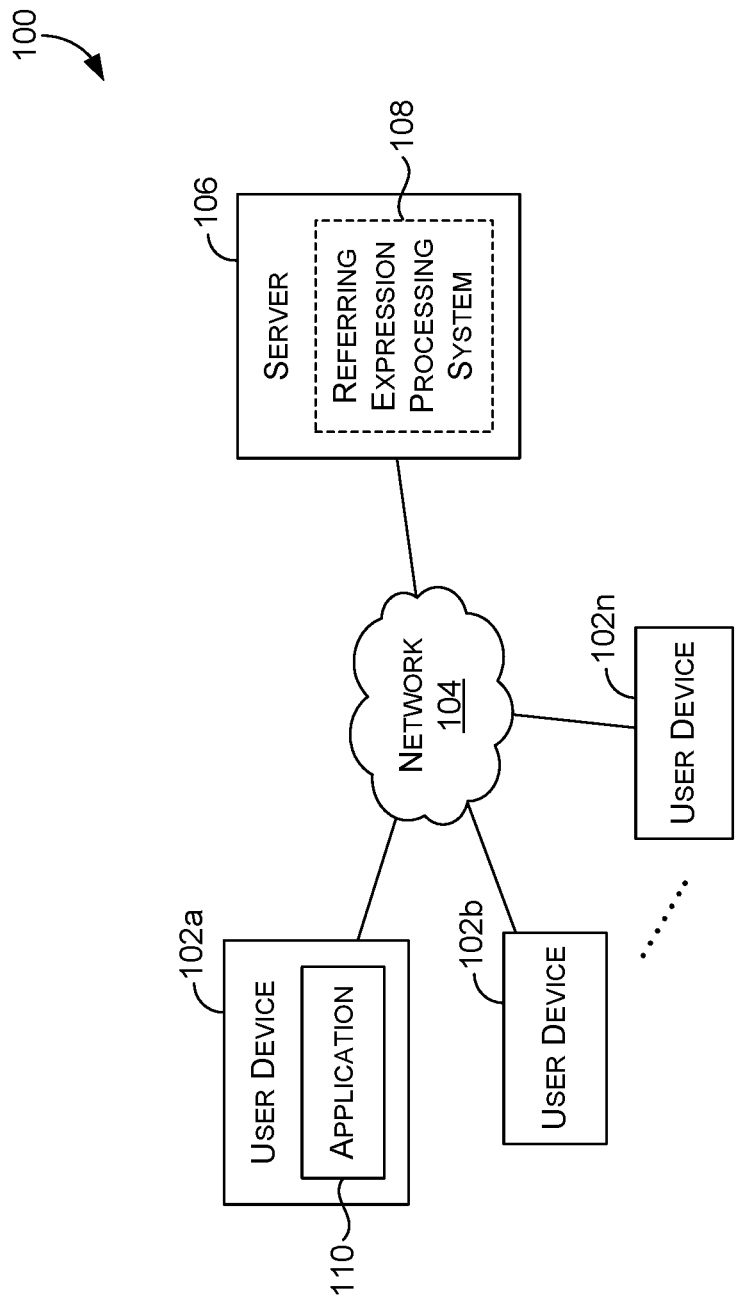
FIG. 1 is a block diagram of an exemplary computing system for parsing a referring expression and generating a semantic computation graph, in accordance with embodiments of the present invention.

Understanding human language and the meaning of phrases is a key component of modern day software and applications. Natural language processing (NLP) allows applications to handle a variety of tasks such as searching for content or handling user commands based on conversational or descriptive user input. For example, applications that store and process images rely on NLP for a wide-range of functionality such as searching for images, handling edit commands for images, or understanding image captions for indexing. As a result, the ability to comprehend a user's input is essential for increasing the functionality and extending the range of capabilities of an application.

Initially, to process user input containing natural language, an input expression (e.g., referring expression) must be converted into a structure or representation that a search engine, conversational assistant, or indexing system can use to process the identified objects, their corresponding attributes, and their interrelationships with other objects in the input expression. Without a representation that captures the meaning or semantics of an input expression, systems (e.g., search engines) must resort to employing keyword searches or other types of functionality that is able to process input. As a result, conventional systems are unable to take advantage of the rich image editing request (IER), image search request (ISR), or image caption (IC) information describing objects (e.g., color, material, size attribute/modifiers). Additionally, traditional systems are unable to associate information between objects (e.g., actions such as "walking" or spatial prepositions such as "next to"). As such, there is a desire to efficiently parse image edit requests, image search requests, or image captions to create a structure that allows accurate NLP functions.

Current approaches use various approaches to extract details from user's input for NLP. For example, existing methods may use soft decomposition to focus on the subject, location, and relationships of objects, but do not attend to other objects, attributes, or relationships that may be present and useful for imaged editing request, image search request, and image caption indexing. Other methods use a systematic language approach to language understanding by using a simple computation graph that relies on a syntactic parser to identify objects and relationship for building the computation graph. Given a syntactic parse structure for an input expression, these methods map the syntactic constituents and relationships present in their parse structure to compose a graph of neural modules that defines the architecture for performing localization.

However, present syntactic parsing methods frequently generate incorrect parse structures for referring expressions of real data. Moreover, other parsing solutions cannot be easily applied to solve this problem because these parsers are not capable of identifying or mapping an Abstract Meaning Representation (AMR) specific to image editing requests, image searching requests, and image captioning domains to the parse output for the needed computation graph. Instead, existing methods operate on basic expressions and only provide coverage for subjection, location, and relationship. Direct and indirect object references are not addressed and additional object attributes and relationships are not considered.

Additionally, current parsing methods cannot handle longer input expressions (e.g., referring expressions) and syntactic parse structures often will incorrectly capture the semantics of the input expression. For example, given the phrase "a white color car behind a girl catching a disc," current methods can return the correct results for an image editing request, image search request, or image captioning operations. However, because these methods are do not take into account all attributes, modifiers, relationships, and other semantic meanings of the expression, slight changes to the phrase, such as "a girl in front of a white color car catching a disc," will result in an incorrect parse structure. As an example, the parse structure and resulting computation graph incorrectly indicate that the "white colored car" is catching the disc and not the girl. As a result, existing approaches will not produce accurate results when performing certain operations that rely on NLP.

Parsing errors like these are systematic and are especially pronounced when handling complex image scenes. For example, an image scene portraying multiple actions is harder for a user describe using simple language. This forces a user to adopt more expressive language for their image editing requests, image search requests, and image captioning tasks to obtain accurate search results. As such, there is a need for a semantics-capturing parse structure transformation that yields a computation graph that accurately reflects the semantics of complex input language.

Accordingly, embodiments of the present invention capture natural language commands, queries, captions, and other textual information from a given input expression (e.g., referring expression) and generate a semantic computation graph that accurately reflects the semantics of the input expression. At a high level, embodiments of the present invention represent an input referring expression in a structured manner to allow intelligent assistants, image search systems, and image indexing engines to extract important object, attribute, and relationship data from the referring expression. Embodiments then use the captured information to create a semantic computation graph that represents an image editing request (IER), image search requests (ISR), and image caption (IC). The semantic computation graph accurately links objects mentioned in an image description to objects labels found by a computer vision object detection system. Thus, by capturing useful semantic information found in an image editing or search request, or in an image caption via an input referring expression, embodiments of the present invention allow fully understand a user's intention (e.g., an image editing request to automatically perform an edit operation, an image search request to perform a more accurate image query, or providing a descriptive image caption that can be used to create a powerful semantic search index).

At a high level, embodiments of the present invention, using a shallow semantic parser conditioned on the distribution of verb and prepositional attachments found in a referring expression testing dataset, accept an IER, ISR, or IC referring expression as input into a parser to output a hierarchical (subject, predicate, object) structure that labels the important noun objects in the input referring expression. Embodiments of the present invention then transform and annotate the outputted structure into a semantic computation graph that identifies and labels attributes, modifiers, and interrelationships between objects including incorporating external knowledge to generalize about the category of the objects identified from the parser.

Specifically, given a parse structure, embodiments of the present invention employ a semantic computation graph generator to create a graph structure that identifies nodes based on phrases from an input referring expression. For example, embodiments of the present invention identify all LOCATE nodes based on noun phrases in a referring expression. Each LOCATE node specifies an operator on an image object variable found in the input request. Additional types of nodes include RELATE, LOCATE, INTERSECT, CONJUNCTION, and DISJUNCTION nodes. As an example, a RELATE node indicates how the LOCATE object is related to other objects and INTERSECT nodes link together LOCATE and RELATE nodes. Using the nodes identified in the semantic computation graph, embodiments of the present invention identify all possible image objects, their attributes, and interrelationships between other objects mentioned in the input referring expression. Subsequently, embodiments of the present invention use this information to create well-formed semantic edit requests or search queries for image applications.

When embodiments of the present invention receive a referring expression, a parse structure is created and mapped into a hierarchical <Subject, Predicate, Object> (<S, P, O>) graph structure. Embodiments of the present invention then transform the <S, P, O> graph into a final semantic computation graph that may be returned to the application or system that sent the referring expression. By recursively traversing the semantic computation graph, each node of the graph (e.g., INTERSECT, LOCATE, CONJUNCTION, DISJUNCTION, and RELATE) can be interpreted to determine the correct objects, attributes, and modifiers in the edit request, query, or computer vision grounding operation. For example, all of the noun objects for each complex noun phrase in the input referring expression may need to be located as specified in the children of LOCATE nodes. As such, embodiments of the present invention enable an application processing the semantic computation graph to determine how noun objects, their attributes, modifiers, and interrelationships from the input referring expression are provided to the downstream editing, searching, or caption indexing tasks.

Advantageously, embodiments of the present invention take into account all attributes, modifiers, and interrelationships between objects in a referring expression. Because external knowledge from lexicon ontologies are employed, embodiments of the present invention are able to understand generalizations and equivalence of object terms by traversing relationships of objects in a lexicon ontology. Accordingly, to obtain a more accurate parse structure, and thus more accurate results based on a given input referring expression, embodiments of the present invention include a grounding ontology that ensures consistent semantic mapping between language objects in a referring expression and computer vision labels even as new terms and vocabulary are added to the ontology.

Having briefly described an overview of aspects of the present invention, various terms used throughout this description are provided. Although more details regarding various terms are provided throughout this description, general descriptions of some terms are included below to provide a clear understanding of the ideas disclosed herein.

Natural language understanding (NLU) or natural language processing (NLP) generally refers to techniques employed to capture and represent objects, their attributes, and their interrelationships to each other, objects expressed in a natural language phrase, sentence, or documents.

Computer vision (CV) generally refers to techniques employed to understand objects and actions depicted in images or video to gain a high-level understanding of visual content, e.g., to detect, classify, and label objects within an image or video.

A referring expression (RE) generally refers to a natural language noun phrase whose function in a dialog, query, or description is to identify one or more individual objects. The subject is the "refer," and the object being identified is a "referent." For example, in the phrase "A blonde woman wearing a plaid shirt," woman is the refer and the object is the plaid shirt. In addition to the referring object and other objects being referred to, there are attributes of the refer and referents and relationships between these objects. Reference objects may use determiners, pronouns, and proper names and reference relationships can be of different types.

A computation graph generally refers to a directed graph where the nodes correspond to operations or slot variables and edges that indicate relationships between nodes. Variables can feed their value into operations and operations can feed their output into other operations. In this way, every node in the graph defines a function of the variables.

Language and/or vision grounding generally refers to the process of associating a named object using language (e.g., "woman," car," "structure," etc.) to an image object label returned by a CV object detector engine. The label may be associated with a mask indicating the region in the image that contains the object.

An image edit request (IER) is a natural language request used for editing an image. For example, the phrase "brighten the man and the woman" is an image editing request to edit an image.

An image search request (ISR) is a natural language request used for searching for images. For example, the phrase "find pictures of children playing with cats" is a search request to find an image.

An image caption (IC) generally refers to a title, caption, or explanation typically provided to describe what is happening in an image.

Example Referring Expression Processing Environment

FIG. 1 depicts a block diagram of exemplary environment 100 suitable for use in implementing embodiments of the invention. Generally, environment 100 is suitable for parsing a referring expression and generating a semantic computation graph, and among other things, facilitates identifying objects and their corresponding semantic relationships based on attributes, modifiers, and interrelationships of objects in the referring expression. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1 is an example of one suitable operating environment. Among other components not shown, operating environment 100 includes a number of user devices, such as user devices 102a and 102b through 102n, network 104, and server(s) 106. Each of the components shown in FIG. 1 may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as abase station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment. User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for parsing a referring expression and generating a semantic computation graph according to the present disclosure. In some implementations, the application(s) comprises a web application, which can run in a web browser, and could be hosted at least partially on the server-side of environment 100. In addition, or instead, the application(s) can comprise a dedicated application, such as an application having image editing or image searching functionality. In some cases, the application is integrated into the operating system (e.g., as a service and/or program). It is therefore contemplated herein that "application" be interpreted broadly. In some embodiments, the application may be integrated with referring expression processing system 108.

In accordance with embodiments herein, application 110 can facilitate identifying objects and their corresponding semantic relationships in a referring expression based on attributes, modifiers, and interrelationships of objects in the referring expression by parsing the referring expression and generating a semantic computation graph via referring expression processing system 108 residing in server 106 to process image editing, searching, and captioning operations. In particular, a referring expression provided by application 110 sent over network 104 to server 106 and processed in referring expression processing system 108 to generate a semantic computation graph. The generated semantic computation graph may be utilized by application 110 on user device 102a through network 104. As such, the generated semantic computation graph provided from server 106 to application 110 can be utilized to search for images, perform image editing operations, or index image captions in application 110.

As described herein, sever 106 can facilitate parsing a referring expression, generating a semantic computation graph and providing the semantic computation graph to an application via referring expression processing system 108. Server 106 includes one or more processors, and one or more computer-readable media. The computer-readable media includes computer-readable instructions executable by the one or more processors. The instructions may optionally implement one or more components of referring expression processing system 108, described in additional detail below. It should be appreciated that while referring expression processing system 108 is depicted as a single system, in embodiments, it can function as multiple systems capable of performing all the attributes of the system as described.

Referring expression system 108 generally parses a referring expression and provides a semantic computation graph to an application residing on a user device. Referring expression system 108 can be implemented to parse a referring expression into a parse structure that identifies attributes, modifiers, and interrelationships of objects in the referring expression. In this regard, a semantic computation graph can be generated based on the parse structure to identify semantic relationships of objects in the referring expression. The semantic computation graph may be utilized for image searching, image editing, or image captioning operations.

For cloud-based implementations, the instructions on server 106 may implement one or more components of referring expression processing system 108. Application 110 may be utilized by a user to interface with the functionality implemented on server(s) 106, such as referring expression processing system 108. In some cases, application 110 comprises an application on a mobile device. In other cases, application 110 comprises a web browser. In yet other cases, server 106 may not be required, as further discussed with reference to FIG. 2. For example, the components of referring expression processing system 108 may be implemented completely on a user device, such as user device 102a. In this case, referring expression processing system 108 may be embodied at least partially by the instructions corresponding to application 110.

Thus, it should be appreciated that referring expression parsing system 108 may be provided via multiple devices arranged in a distributed environment that collectively provide the functionality described herein. Additionally, other components not shown may also be included within the distributed environment. In addition, or instead, referring expression parsing system 108 can be integrated, at least partially, into a user device, such as user device 102a. Furthermore, referring expression system 108 may at least partially be embodied as a cloud computing service.

Figure 2:
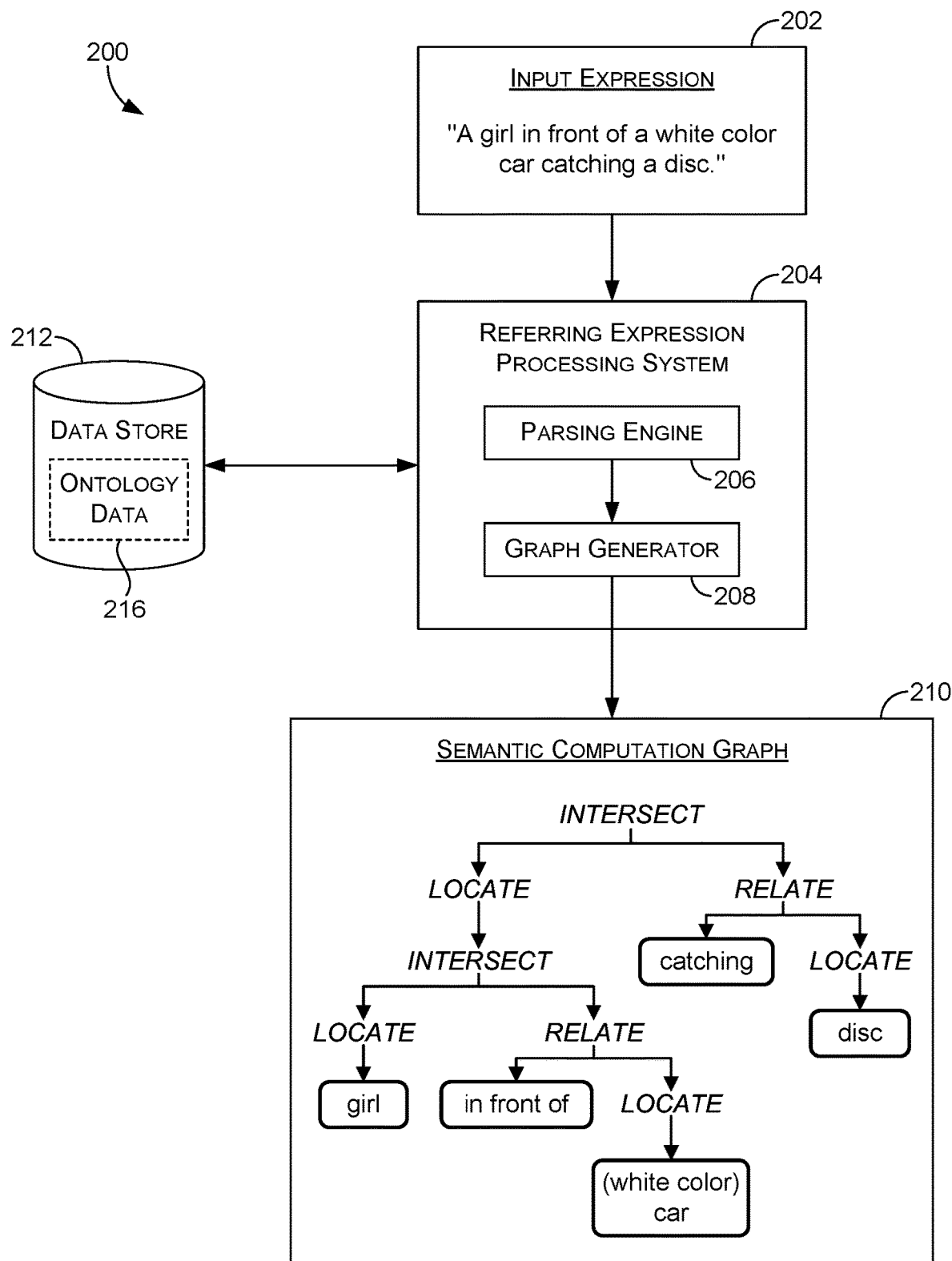
FIG. 2 is a block diagram of an exemplary computing system for parsing a referring expression and generating a semantic computation graph, in accordance with embodiments of the present invention.

Referring to FIG. 2, a block diagram is provided showing an illustrative referring expression processing system environment 200 for generating a semantic computation graph from an input expression. Data store 212 can store computer instructions (e.g., software program instructions, routines, or services), data, and/or models used in embodiments described herein. In some implementations, data store 212 stores information or data used by parsing engine 206 and graph generator 208 to generate a semantic computation graph. Although depicted as a single component, data store 212 may be embodied as one or more data stores. Further, the information in data store 212 may be distributed in any suitable manner across one or more data stores for storage (which may be hosted externally).

In embodiments, data stored or contained in data store 212 includes collected images, pictures, illustrations, photographs, other related image data, lexicons and vocabularies, part-of-speech (POS) data including POS taggers, that may be utilized by parsing engine 206 and graph generator 208 for parsing an input expression and generating a semantic computation graph. Image data generally refers to any information collected or generated from an image such as, but not limited to, an image caption. In some instances, an image caption may include a referring expression that can be input into referring expression processing system 204 as an input expression 202. Data store 212 also includes data used to train POS models and rules, parsers, segmenters, tokenizers, and other elements that are used to generate a semantic computation graph. For example, data collected from different generic POS sources and domain specific sources may be stored or collected in data store 212 to build POS lexicons that are used to generate a semantic computation graph. Data store 212 may also include datasets comprised of image editing requests, image search requests, and image caption data that may be used by embodiments of the present invention to train referring expression processing system 204 to efficiently generate an accurate semantic computation graph 210.

Furthermore, data store 212 may contain ontology data 216 such as a grounding ontology for language and vision objects. For example, for each object (i.e., noun phrase) in a referring expression, embodiments of the present invention may ground the underlying object to the computer vision object label to build an aligned understanding of objects in an image request or description then matched against the object labels returned by a computer vision engine. Grounding ontology data 216 may be generated by matching labels of objects known to an image object detector or classifier against entities in language lexicon resources such as WordNet, dictionaries (e.g., Merriam-Webster, Collins, etc.), or custom entity vocabularies.

Embodiments of the present invention may use ontology data 216 to learn and use a lexicon for the following types of attributes and/or modifiers: color—object color e.g., using a standard color ontology, e.g. the invention detects and classifies object color modifiers and provides HSV values from a color database; size modifiers—relative size modifiers e.g., "large", "larger", "largest", etc.; material modifiers—object material adjectives are identified, e.g., "wooden", "metal", "leather", using a material ontology; texture modifiers—surface texture, e.g. "rough", "smooth", "scratchy", "polished"; emotion modifiers—emotion and affective adjectives from sentiment lexicons are provided; lightning modifiers—indicate lighting information for a scene or objects (e.g., "bright"); atmospheric modifiers—indicate scene attributes such as weather effects (e.g., "snowy"); location modifiers—describe if objects are near by, distant, rightmost, etc.; handling composite attributes—the automatic attribute mechanism needs to support multiple image attributes or modifiers (e.g. "the smallest turquoise porcelain vase."). These attributes and modifiers are used by referring expression processing system 204 to generate semantic computation graph 210.

Ontology data 216 enables synonym and hypernym term expansions of the vision labels to identify candidate grounding terms. For example, a vision label "tank" is expanded by generating candidate lexicon ontology terms that include: a military tank and a water tank. Embodiments of the present invention generate all possible definitions or term senses and object distributions from caption training data and common language usage can be used to identify a set of likely candidate groundings. Advantageously, seed generation for the grounding ontology is automatic, the process can be verified, the ontology data is extensible, and it evolves as both language and visual components improve over time.

As briefly mentioned above, embodiments of the present invention use ontology data 216 to generate semantic computation graph 210. Embodiments may automatically traverse a WordNet ontology and external definition lexicon dictionaries (e.g., Merriam-Webster, Collins, etc.), and enumerate definitions, synonyms, and hypernym candidates for a particular term. Default annotations of the most likely WordNet sense for each term may be generated using vision label metadata and learned ranking heuristics. Embodiments of the present invention may then verify the groundings for use by referring expression processing system 204. Embodiments of the present invention represent the ontology data as human-readable IDs that allow labeled hierarchies to be preserved and mapped to the appropriate WordNet language lexicon term. By expressing the computer vision label hierarchy using a flattened multi-column representation, embodiments of the present invention can efficiently review, update, delete, or add entries or sub-hierarchies. Moreover, embodiments of the present invention are able to ground language noun phrases to computer vision labels using object subtypes and super types while eliminating non-relevant objections or noun terms with an incorrect word sense. As a result, referring expression processing system 204 can efficiently generate an accurate semantic computation graph that captures as many object attributes and modifiers as possible.

Referring expression processing system 204 can generate a semantic computation graph by parsing an input expression (e.g., an image editing request, an image search request, or an image caption) to generate a hierarchical (subject, predicate, object) structure that labels important noun objects, attributes of the objects, and predicate relationships (e.g., verb actions or spatial prepositions) between the noun objects identified in the input expression. Embodiments of the present invention then transform and annotate the hierarchical structure into a semantic computation graph. As such, the semantic computation graph generated by referring expression processing system 204 may be accessed by an application to process the semantic computation graph and determine how noun objects, their attributes and modifiers, and interrelationships are provided to downstream image editing, searching, or caption indexing tasks.

As an overview, referring expression processing system 204 may receive an input expression 202, parse the expression, generate a hierarchical structure, and generate a semantic computation graph based on the hierarchical structure. The generated semantic computation graph may be accessed or used by other software or a different application to accomplish tasks such as image editing, searching, or caption indexing.

In this way, to initiate generating a semantic computation graph based on a hierarchical structure that labels the important noun objects, attributes, modifiers, and interrelationships of objects found in an input expression, referring expression processing system 204 can receive an input expression 202. In some embodiments, input expression 202 may be a referring expression. Input expression 202 may be received or accessed in any suitable manner and may be generated based on spoken or textual input. As contemplated in this disclosure, input expression 202 may be a referring expression that is that is part of an image editing request, search request, or an image caption. For example, input expression 202 may state "A girl in front of a white color car catching a disc." This referring expression may have been input into a search box from another application or program and send to referring expression processing system 204. Although not shown for clarity, in some cases, input expression 202 may be received from another system or application. As such, input expression 202 can be used as initial input to generate a semantic computation graph, discussed further below with reference to parsing engine 206 and graph generator 208.

Referring expression processing system 204 can include parsing engine 206 and graph generator 208. The foregoing components of referring expression processing system 204 can be implemented, for example, in operating environment 100 of FIG. 1. In particular these component may be integrated into any suitable combination of user devices 102a and 102b through 102n, and server(s) 106.

Parsing engine 206 of referring expression processing system 204 is generally configured to parse input expression 202 and generate a hierarchical (subject, predicate, object) structure that labels noun objects in input expression, the attributes and modifiers of the objects, and predicate relationships (e.g., verb action or spatial prepositions) between objects. Parsing engine 206 initially receives an input expression 202 and generates a parse tree. The parse tree is then mapped into a hierarchical <S, P, O> graph structure that may be used by graph generator 208 to generate semantic computation graph 210.

Graph generator 208 of referring expression processing system 204 is generally configured to generate semantic computation graph 210 based on a hierarchical structure generated by parsing engine 206. Embodiments of the present invention transform the hierarchical <S, P, O> into semantic computation graph 210 that identifies all LOCATE nodes based on noun phrases in input expression 202 and labeled by parsing engine 206. For example, as shown in FIG. 2, each LOCATE node specifies an operator on an image object slot variable found in input expression 202. A RELATE node indicates how the objects under a LOCATE node are related to other objects. INTERSECT nodes link together LOCATE and RELATE nodes. As a result, semantic computation graph 210 identifies all possible image objects, their attributes, and interrelationships between other objects mentioned in input expression 202.

At a high level, semantic computation graph 210 is a computation graph comprised of a graph structure that identifies and annotates image objects being referenced in input expression 202. In some embodiments, object phrases may also include attributes that are added into semantic computation graph 210 based on ontology data 216. For example, embodiments of the present invention may use hypernym and synonymy expansion of identified attributes to expand semantic computation graph to include other attributes that are similar to those in the input expression. As a result, semantic computation graph 210 may be utilized by other systems, software, applications, or programs to perform tasks. For example, another application may recursively traverse semantic computation graph 210 and interpret each node to determine the correct object edit request of an image, interpret an image query, or perform the correct CV grounding operation.

A semantic computation graph generated by embodiments of the present invention have five different types of nodes to capture the necessary computations for localizing a target object in an image. INTERSECT nodes are used to compose nested object structures. LOCAE nodes specify a noun phrase (e.g., "half sandwich", "plate", "coffee mug"), in ungrounded form they indicate candidate labels found by the CV engine; once grounded they indicate agreement by the NLU and CV system that a referenced object corresponds to a specific CV object label present in the image. Prepositional phrases ("on right side", "nearest") correspond to RELATE nodes in the computation graph. RELATE nodes calculate how likely objects are related to the grounding of objects with a given spatial prepositional phrase. Embodiments of the present invention are able to learn spatial propositions using any suitable model for joint vision/language-based image searching. All phrases coming from branches of a shallow semantic parse tree are used to form INTERSECT nodes. As a result, INTERSECT nodes have two possible node subtypes to handle complex list-oriented subject expressions: CONJUNCTION and DISJUNCTION. A CONJUNCTION node is able to enumerate object terms via a set of AND operations. A DISJUNCTION node is able to enumerate object terms via a set of OR operations. Additionally, for INTERSECT nodes, all of the noun objects for each complex noun phrase may need to be located (specified in the children LOCATE nodes) so an application processing the semantic computation graph can determine how these noun objects, their attributes and modifier, and interrelationships are provided to the downstream editing, searching, or caption indexing tasks.

Figure 3:
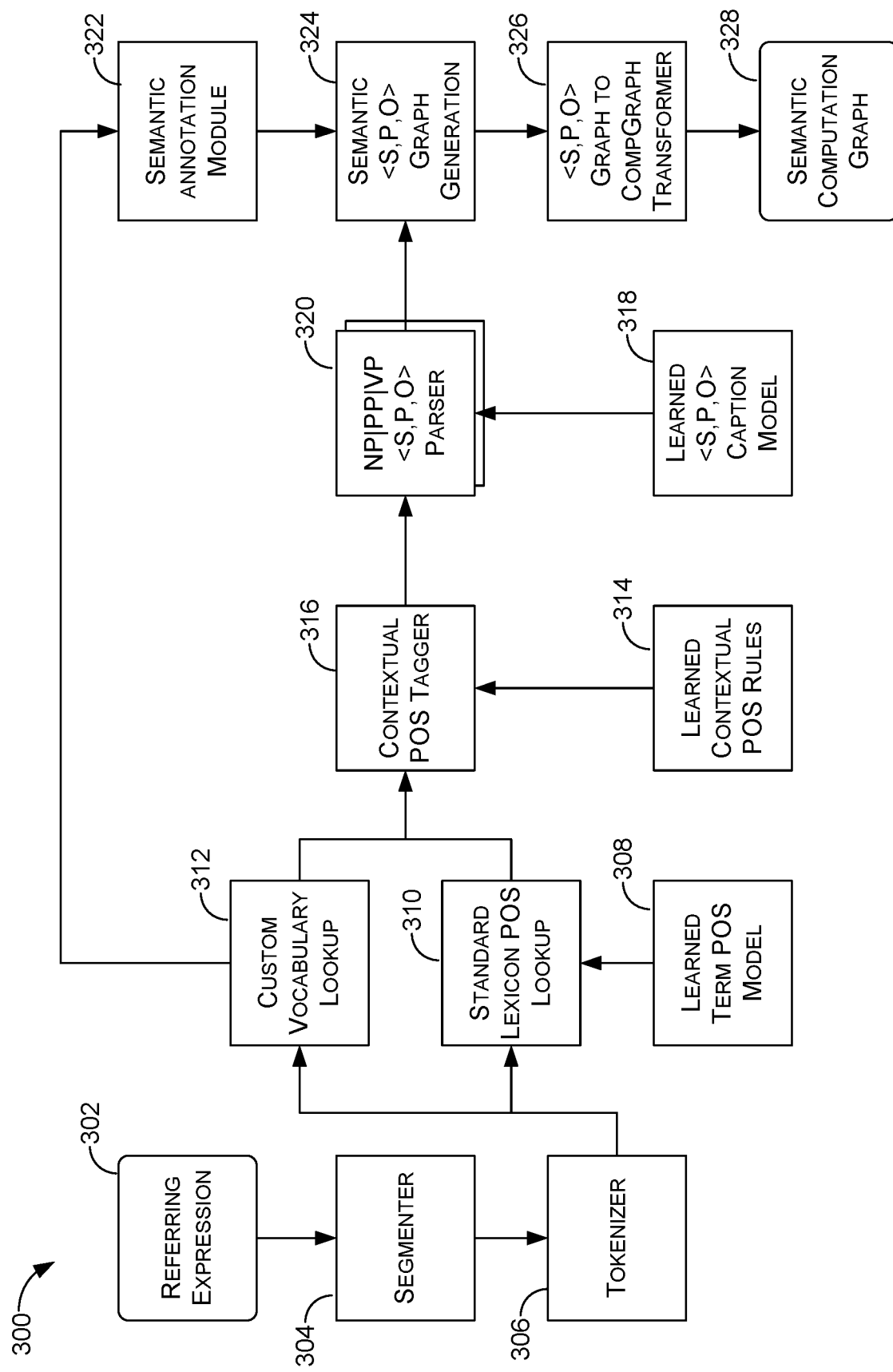
FIG. 3 is an exemplary flow diagram illustrating the architecture and process for parsing a referring expression and generating a semantic computation graph, in accordance with embodiments of the present invention.

Referring now to FIG. 3, an exemplary flow diagram illustrating the architecture and process for parsing a referring expression and generating a semantic computation graph is shown, in accordance with embodiments of the present invention. Embodiments of the present invention implement the architecture described below into referring expression processing system 108 and 204 as described in conjunction with at least FIGS. 1 and 2.

Initially, at step 302, a referring expression is input into a segmenter. At step 204, the segmenter processes any multi-sentence referring expression input. The segmented referring expression generated at step 304 is passed to the tokenizer at step 306 where each segment is broken into pieces such as words, keywords, phrases, and other elements. Using the tokenized expression, a standard lexicon POS lookup at step 310 or a custom vocabulary 312 lookup can be used to spot key words and terms in the tokenized expression. Using a learned term POS model from step 308, key words and terms can be identified using the standard lexicon POS lookup in step 310. The POS lexicons in steps 310 and 312 are built using data collected from different generic POS sources and domain specific sources.

Embodiments of the present invention may use sequential POS data to learn the contextual grammar rules at step 314. Any suitable contextual POS tagger may then be used at step 316 using the learned contextual POS rules of step 314. Taking input from the contextual POS tagger at step 316, embodiments of the present invention generate a parse tree expression using an extended transformation grammar parser conditioned on annotate referring expressions for image captions. A <Subject, Predicate, Object> (<S, P, O>) graph generator utilized by embodiments of the present invention at step 324 restructures the parse tree output from step 320 into a single or nested <S, P, O> structure. At step 324, embodiments of the present invention restructure the parse tree output from step 320 by applying a rule set comprised of learned chunking patterns for noun expressions, verb expressions, and proposition expressions from a learned <S, P, O> caption model in step 318. It is contemplated by this disclosure that embodiments of the present invention may use any suitable parser (e.g., a self-attention neural parser) at step 320.

Once embodiments of the present invention create the <S, P, O> structure, at step 326 the structure is recursively traversed to generate the final semantic computation graph representing the input referring expression from step 302. Embodiments of the present invention then use a semantic annotation module from step 322 to automatically provide hypernym and synonym lexicon expansion as well as attribute and modifier object annotations to the semantic <S, P, O> structure generated by step 324. The semantic annotation module of step 322 utilizes the custom vocabulary lookup from step 312 to perform hypernym and synonym lexicon expansion and annotate the attribute and modifiers of objects identified in the input referring expression. At step 328, the final semantic computation graph is generated and may be returned to a client application that initially sent the referring expression at step 302.

Figure 4A:
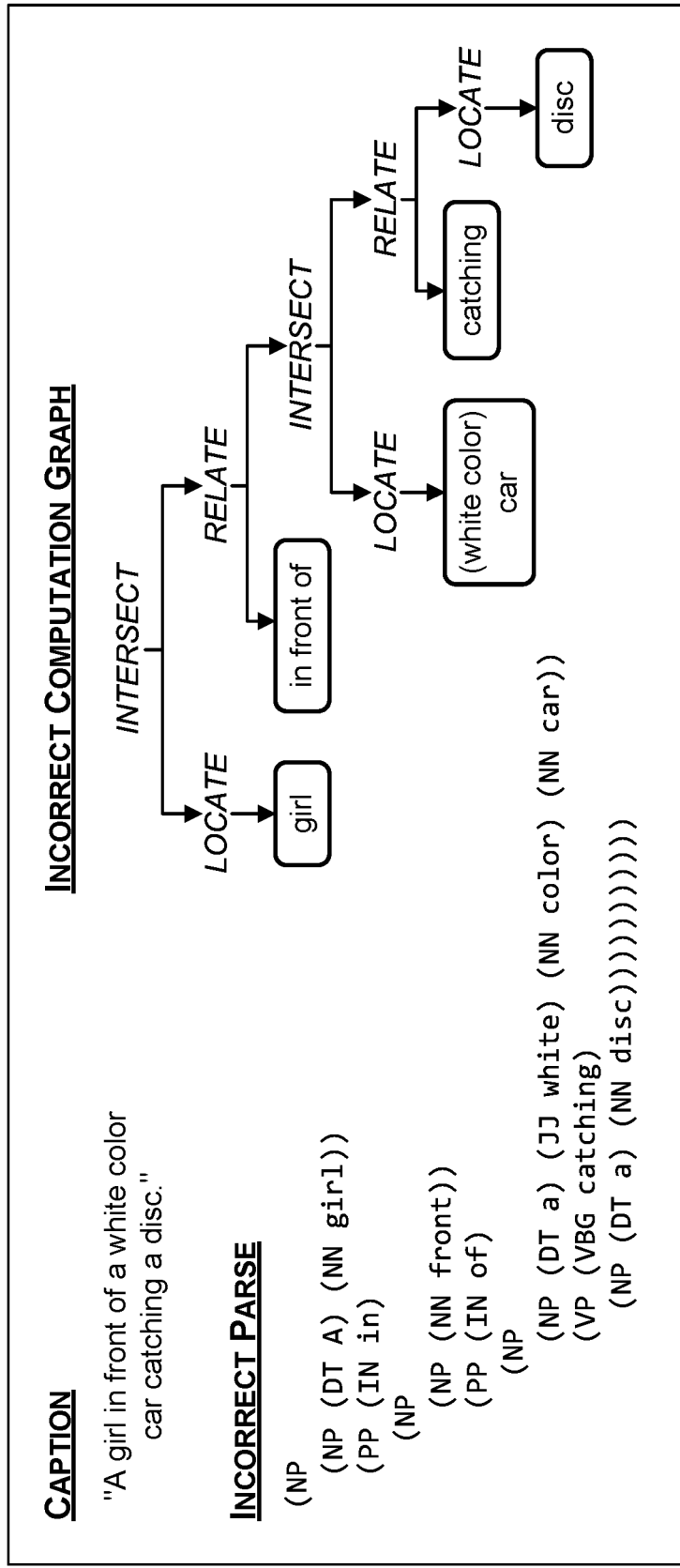
FIG. 4A is an exemplary illustration of an incorrect parse structure and an incorrect computation graph generated by traditional methods, in accordance with embodiments of the present invention.
Figure 4B:
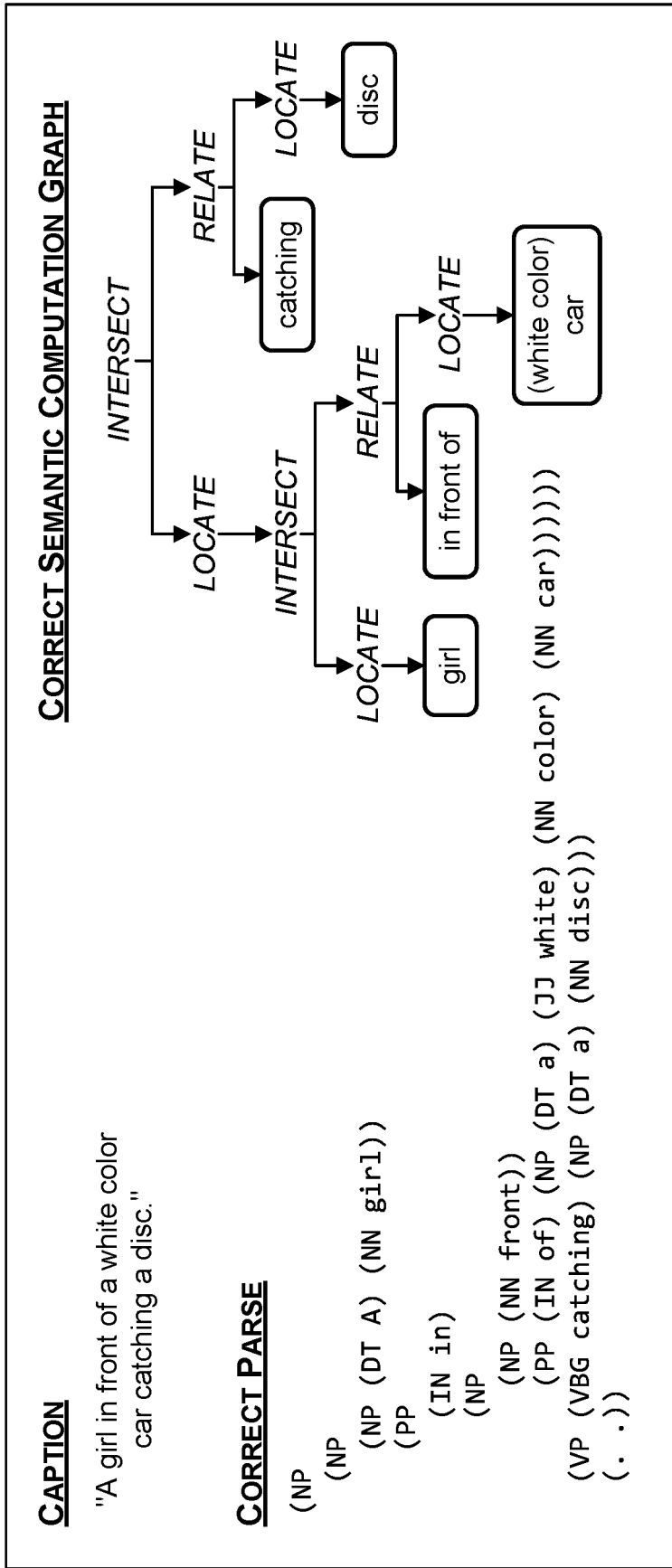
FIG. 4B is an exemplary illustration of a correct parse structure and a correct semantic computation graph generated for a given referring expression, in accordance with embodiments of the present invention.

Turning now to FIGS. 4A and 4B, FIG. 4A is an exemplary illustration of an incorrect parse structure and an incorrect computation graph generated by traditional methods, in accordance with embodiments of the present invention. As shown, an incorrect computation graph and an incorrect parse tree are generated from the caption "A girl in front of a white color cat catching a disc" using traditional methods. For example, the parse tree and resulting computation graph in FIG. 4A incorrectly indicate that "the white colored car" is catching the disc and not the girl. On the other hand, FIG. 4B is an exemplary illustration of a correct parse structure and a correct semantic computation graph generated for a given referring expression, in accordance with embodiments of the present invention. As show, the parse tree and resulting semantic computation graph in FIG. 4B correctly indicate that the girl is catching the disc, as opposed to the incorrect computation graph in FIG. 4A. FIGS. 4A and 4B are exemplary of illustrations demonstrating the difference between conventional methods and embodiments of the present invention that are able to generate a correct semantic computation graph for a given referring expression that allows for accurate image editing and searching, as well as indexing image captions.

Figures 5A, 5B:
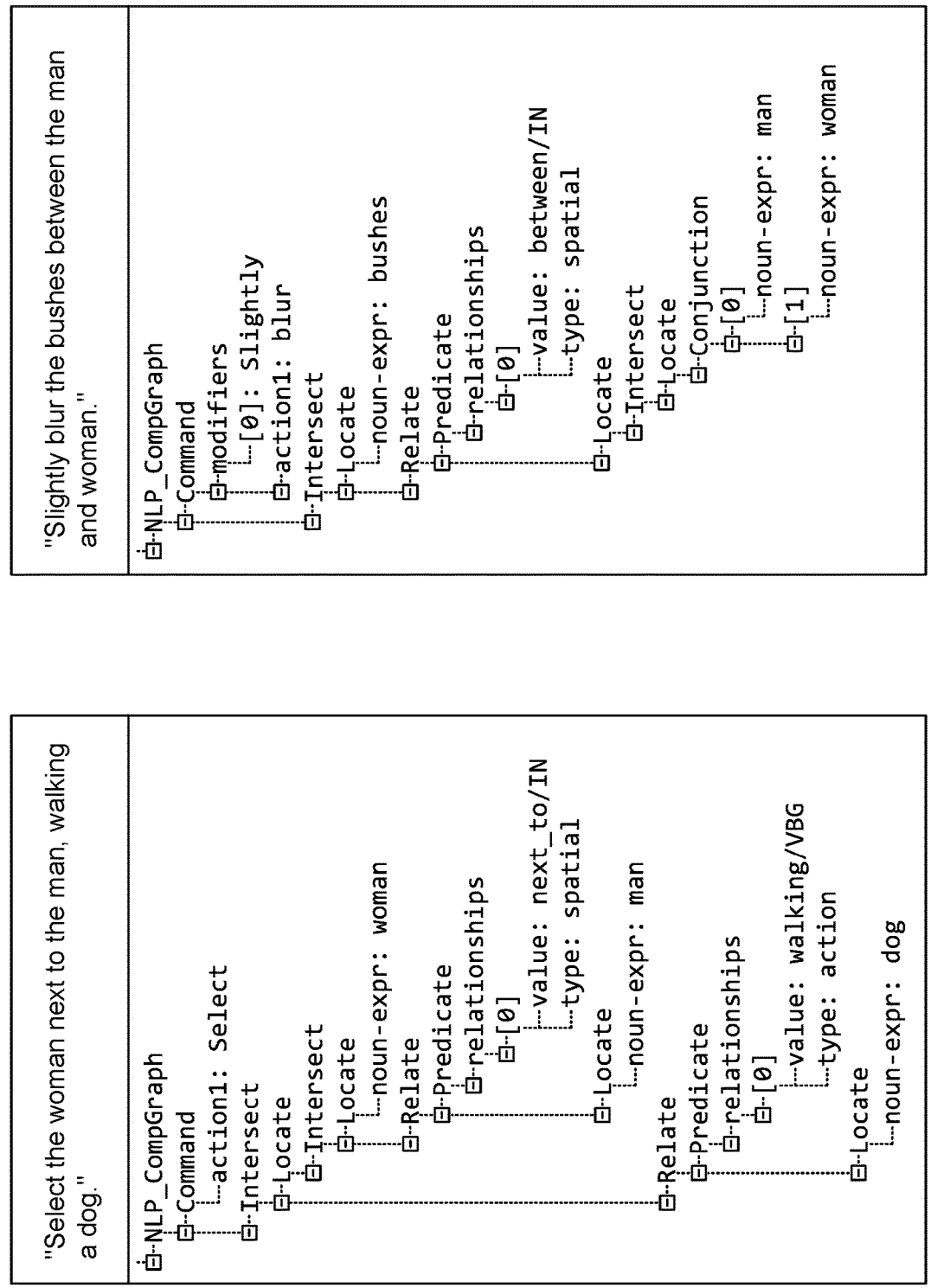
FIGS. 5A and 5B are exemplary illustrations of a generated semantic computation graph for different referring expressions, in accordance with embodiments of the present invention.

Turning now to FIGS. 5A and 5B, FIG. 5A and FIG. 5B are exemplary illustrations of a generated semantic computation graph for different referring expressions, in accordance with embodiments of the present invention. FIG. 5A shows the semantic computation graph generated by embodiments of the present invention for the referring expression, "Select the woman next to the man, walking a dog." FIG. 5B shows the semantic computation graph generated by embodiments of the present invention for the referring expression "Slightly blur the bushes between the man and woman." The semantic computation graphs shown in FIGS. 5A and 5B show several examples of nodes generated by embodiments of the present invention to accurately determine relationships between objects in the referring expression. For example, nodes such as INTERSECT, LOCATE, CONJUNCTION, and RELATE, show in FIGS. 5A and 5B, enable other systems, software, applications, programs, or the like to determine proper relationships of objects in an input expression and use those relationships to perform additional tasks or operations.

In the examples shown in FIGS. 5A and 5B, the top-level INTERSECT node indicates that the primary LOCATE object has an interaction or spatial relationship with other objects labeled under a LOCATE node. Other systems, software, applications, programs, or the like may use a preorder traversal of the semantic computation graph hierarchies shown in FIGS. 5A and 5B to identify all the identified noun phrases that may have to be localized and grounded in conjunction with a CV selection engine. As shown, a top-level LOCATE node frequently identifies the primary subject of interest in an input request.

Referring now to FIG. 6, an exemplary is an exemplary illustration of a generated semantic computation graph for a given referring expression that includes hypernym expansions, in accordance with embodiments of the present invention. Similar to the semantic computation graphs of FIGS. 5A and 5B, the semantic computation graph illustrated in FIG. 6 shows a semantic computation graph that includes hypernym expansions of noun expressions identified by embodiments of the present invention. For example, the referring expression of FIG. 6 is "Brighten my girlfriend walking our corgi wearing the red and grey plain pullover." The semantic computation identifies all nouns under the LOCATE nodes and then performs hypernym and synonym expansion. For example, the noun expression identified as "our corgi" is further expanded to include hypernyms such as dog, canine, carnivore, and animal. As another example, the noun expression identified as "pullover" from the referring expression is further expanded to include hypernyms such as sweater, garment, clothing, and consumer goods. As such, FIG. 6 demonstrates how embodiments of the present invention take into account multiple attributes and modifiers of an object in an expression by using external knowledge to construct hypernyms and synonyms for the identified objects that can be used for performing image editing, searching, and caption indexing tasks.

The computation graph shown in FIG. 6 demonstrates that both physical objects and objects in an image may include many different modifiers when described by text. For example, a user may be interested in a specific "large, furry, tan tabby cat." In this case, several different types of adjectives are used to describe the cat. As such, embodiments of the present invention can implement different categories of attributes and modifiers. Modifiers can take adjective form, noun-noun form or verb forms such as VB (-ed forms, e.g., "stained glass," "parked car") or VBG (-ing forms, e.g., "a walking man"). Additionally, modifiers can also be compound. As such, embodiments of the present invention can recognize many different modifiers and attributes. Some of these attributes are shown in FIG. 6. For example, the colors "red" and "grey" that described the noun expression "pullover" are identified as color modifiers. However, some of the attributes and modifiers that embodiments of the present invention can recognize are not shown in FIG. 6 but are described in more detail below.

Embodiments of the present invention recognize common and descriptive color names by building a primary, secondary, tertiary, and extended color name ontology. Color names from the first three categories can also be directly combined to describe new colors by naming a 2-color mixture. Standard and additional color ontologies were learned from several external sources (e.g., Sherwin Williams, Wikipedia, Cayola Crayon color names, Xkcd color name survey, prior compilations, Sennelier paint color names, HMI web colors, etc.). Embodiments of the resent invention identify color adjectives within LOCATE nodes of the semantic computation graph are extract them as MODIFIERS. These color modifiers identified for a noun phrase in a LOCATE node may be provided to a CV system and can be used to find the closest match NLU colors (from color triple values of the modifiers from the color ontology database) against detected colors from the CV system (e.g., using color histogram information for each object label mask). To learn the color modifier lexicon, embodiments of the present invention use a text mining pipeline that builds a color ontology based on both semantic names and on color values. The ontology is used by a specialized color attribute modifier module that recognizes common colors, color modifiers, color combinations, as well as extended color qualifiers (e.g., "champagne colored").

Embodiments of the present invention also recognize size modifiers that indicate relative size across different dimensions including width, height, and comparative measures (e.g., big, bigger, biggest, small, smaller, smallest, etc.). Embodiments of the present invention mine this text from a standard POS lexicon.

Embodiments of the present invention can also recognize material modifiers that fit into a larger ontology of object descriptors. Embodiments provide adjective and noun forms for all LOCATE nodes nouns when available. For example, a table could be described as either a "wood table" or "wooden table." Material modifiers identified may include building materials (e.g., brick building, concrete wall, etc.), rock material (e.g., stone tiles, gravel road, marble vase, etc.), plant material (e.g., straw hat, hardwood flood, etc.), animal material (e.g., fur coat, leather jacket, etc.), food material (e.g., fruit salad, chocolate cake, etc.), fabric material (e.g., nylon tank top, polyester trousers, etc.), waster material (e.g., trash pile, scrap metal, etc.), and miscellaneous material (e.g., wicker basket, cardboard box, etc.). Embodiments of the present invention use several materials sub-ontologies mined from external resources (e.g., WordNet).

Embodiments of the present invention can also recognize texture modifiers that describe surface appearance with visual manifestations for tactile properties of an object. For example, texture modifiers may include "smooth," "cracked," "rough," "worn," "wrinkled," etc. Embodiments learn these terms using a standard terminology lexicon.

Embodiments of the present invention also recognize emotion modifiers that are derived and learned from a sentiment vocabulary (e.g., the Harvard General Inquirer). The emotions learned by embodiments of the present invention include terms covering Plutchik's Primary 8 model of emotions and emotion combinations and include emotion terms that have a physical, facial manifestation. For example, a person that is smiling, frowning, happy, angry, surprised, etc.

Embodiments of the present invention also recognize lighting, atmospheric, and location modifiers. Lighting modifiers further specify the optical surface quality of a referenced objects or locate regions of an image that have a specific lighting characteristic (e.g., shiny, reflective, glossy, murky, etc.). Atmospheric modifiers describe attributes of atmospheric phenomena in an image such as the presence of skies, clouds oceans, or weather elements in a scene (e.g., fog/foggy, smog/smoggy, overcast, rainy, snowy, etc.). Location modifiers indicate where an object is in an image and are different than spatial propositions which indicate the spatial relationship between objects. For example, basic location modifiers include "left," "leftmost," "top," "topmost," "center," "lower," etc.

Embodiments of the present invention also recognize collection modifiers. These terms are important because embodiments of the present invention are able to identify whether an identified object in a referring expression is a single object or a collection (e.g., "a herd of elephants"). Embodiments of the present invention learn a lexicon of collection and aggregation modifiers to identify these terms (e.g., collection, group of, set of, piles of, bunch of, crowd, of, etc.).

Embodiments of the present invention may also recognize composite modifiers and attributes. Because natural language descriptions, including referring expressions, may employ multiple adjective modifiers when describing an image object, embodiments of the present invention represent these modifiers in the extensible "modifier" structures of each noun phrase of a LOCATE node within a sematic computation graph. This modifier structure consists of an array of modifier description children nodes that indicate the modifier value (e.g., "bronze") and the modifier type (e.g., "MATERIAL").

Example Flow Diagrams

Figure 7:
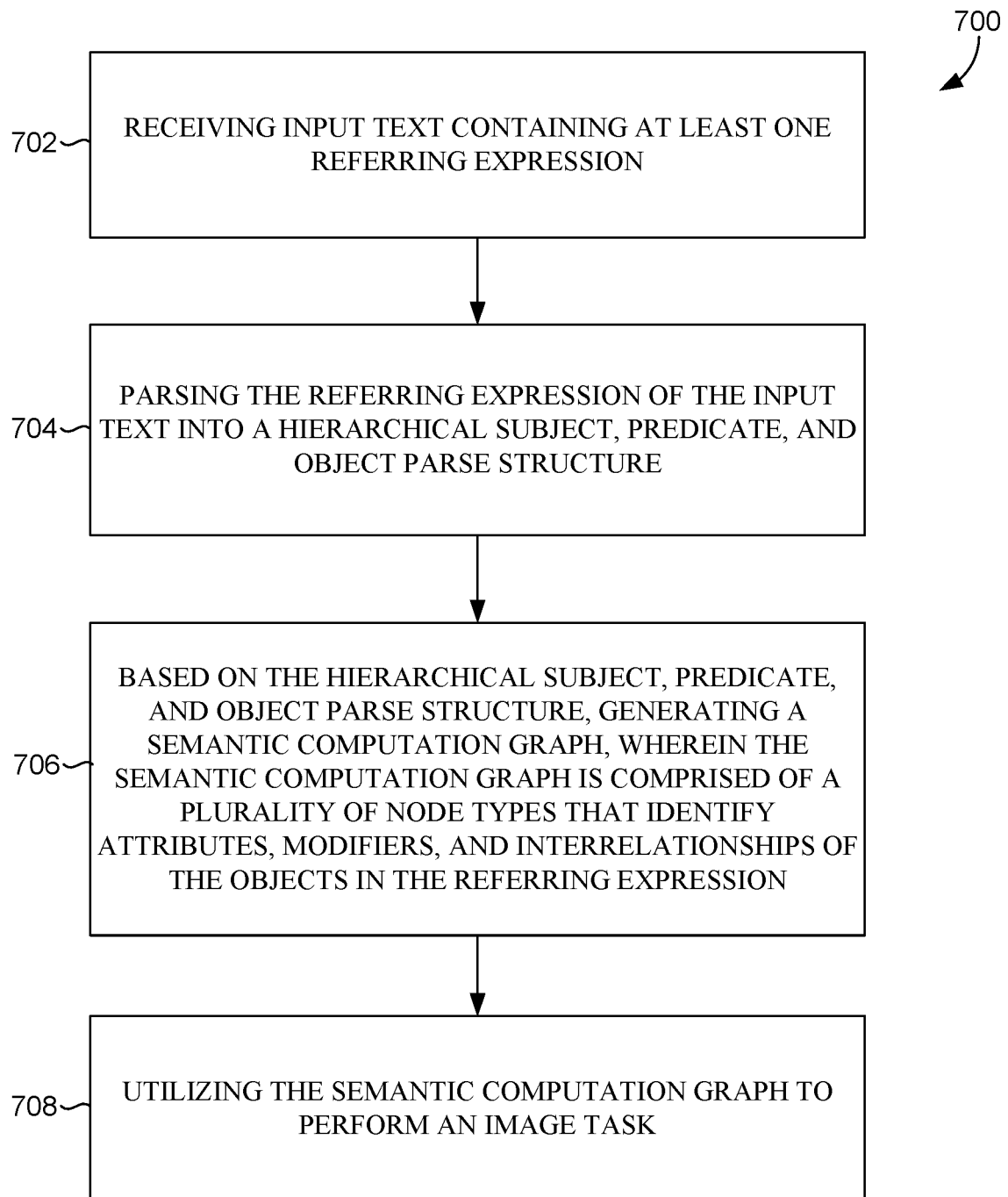
FIG. 7 is a flow diagram showing a method for, in accordance with embodiments of the present invention.

With reference now to FIG. 7, a flow diagram is provided illustrating method 700 for generating a semantic computation graph. Each block of method 700, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method 700 may be implemented by referring expression processing system 204 as described in conjunction with at least FIGS. 1-6.

Turning initially to FIG. 7, FIG. 7 illustrates a method 700, in accordance with embodiments described herein. Method 700 can be performed, for instance, by referring expression processing system 204 using parsing engine 206 and graph generator 208 of FIG. 2. Initially, as shown at block 702, input text containing at least one referring expression is received. At block 704, the referring expression of the input text is parsed into a hierarchical subject, predicate, and object parse structure. At block 706, a semantic imputation graph is generated based on the hierarchical subject, predicate, and object parse structure. The generated computation graph is comprised of a plurality of node types that identify attributes, modifiers, and interrelationships of objects in the referring expression. At block 708, the semantic computation graph is utilized to perform an image task.

Example Operating Environment

Figure 8:
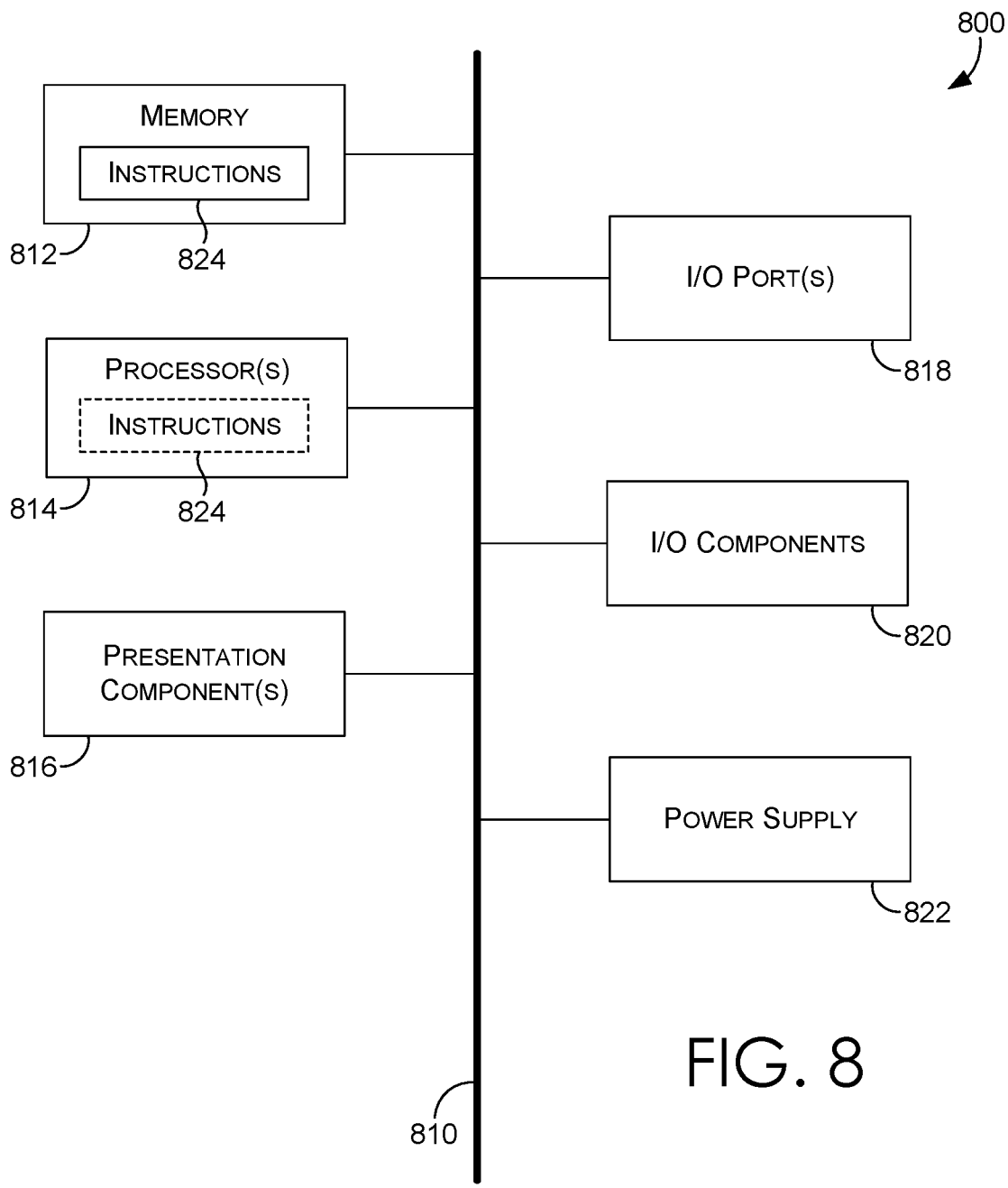
FIG. 8 is a block diagram of an exemplary operating environment in which embodiments of the present invention may be employed.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8 computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A computer-implemented method comprising:
receiving input text containing at least one referring expression referencing a first image object, a second image object, and a spatial relationship between the first image object and the second image object;
generating a semantic computation graph comprising a predicate node that represents the spatial relationship between the first image object and the second image object; and
performing an image task based on traversing the semantic computation graph to match the at least one referring expression with a computer vision label associated with an image that contains a detected instance of the first and second image objects.

2. The computer-implemented method of claim 1, wherein the semantic computation graph comprises a modifier node that represents an object modifier in the referring expression and classifies the object modifier into a modifier type and a value of the modifier type.

3. The computer-implemented method of claim 1, wherein the predicate node represents the spatial relationship between the first image object and the second image object using a spatial preposition.

4. The computer-implemented method of claim 1, wherein the image task comprises associating the semantic computation graph with object information from a computer vision system for image editing requests.

5. The computer-implemented method of claim 1, wherein the image task comprises generating a query intention model to represent the at least one referring expression in an image query.

6. The computer-implemented method of claim 1, wherein the image task comprises extracting information from an image caption based on the semantic computation graph to create a semantic index for an image search system.

7. The computer-implemented method of claim 1, wherein the semantic computation graph comprises an object node that represents the first image object and stores or identifies a plurality of hypernyms or synonyms of the first image object, wherein traversing the semantic computation graph to match the at least one referring expression with the computer vision label comprises matching the computer vision label with one of the plurality of hypernyms or synonyms of the first image object.

8. The computer-implemented method of claim 1, wherein the semantic computation graph comprises an object node that represents the first image object, wherein generating the semantic computation graph comprises using an extensible grounding ontology that expands over time to expand the object node to represent hypernyms or synonyms of the first image object.

9. A system comprising:
one or more hardware processors; and
one or more non-transitory computer storage media storing computer-useable instructions that, when executed by the one or more hardware processors, cause the one or more hardware processors to execute operations comprising:
receiving input text containing at least one referring expression referencing a first image object, a second image object, and a spatial relationship between the first image object and the second image object;
generating a semantic computation graph comprising a predicate node that represents the spatial relationship between the first image object and the second image object; and performing an image task based on traversing the semantic computation graph.

10. The system of claim 9, wherein the semantic computation graph comprises a modifier node that represents an object modifier in the referring expression and classifies the object modifier into a modifier type and a value of the modifier type.

11. The system of claim 9, wherein the predicate node represents the spatial relationship between the first image object and the second image object using a spatial preposition.

12. The system of claim 9, wherein the image task comprises associating the semantic computation graph with object information from a computer vision system for image editing requests.

13. The system of claim 9, wherein the image task comprises generating a query intention model to represent the at least one referring expression in an image query.

14. The system of claim 9, wherein the image task comprises extracting information from an image caption based on the semantic computation graph to create a semantic index for an image search system.

15. The system of claim 9, wherein the semantic computation graph comprises an object node that represents the first image object and stores or identifies a plurality of hypernyms or synonyms of the first image object, wherein traversing the semantic computation graph is to match the at least one referring expression with a computer vision label associated with an image that contains a detected instance of the first and second image objects based at least on matching the computer vision label with one of the plurality of hypernyms or synonyms of the first image object.

16. The system of claim 9, wherein the semantic computation graph comprises an object node that represents the first image object, wherein generating the semantic computation graph comprises using an extensible grounding ontology that expands over time to expand the object node to represent hypernyms or synonyms of the first image object.

17. One or more non-transitory computer storage media having computer-executable instructions embodied thereon that, when executed, by one or more processors, cause the one or more processors to perform operations comprising:
   receiving input text containing at least one referring expression referencing a first image object, a second image object, and a spatial relationship between the first image object and the second image object; and
   generating a semantic computation graph comprising a predicate node that represents the spatial relationship between the first image object and the second image object.

18. The one or more non-transitory computer storage media of claim 17, wherein the semantic computation graph comprises a modifier node that represents an object modifier in the referring expression and classifies the object modifier into a modifier type and a value of the modifier type.

19. The one or more non-transitory computer storage media of claim 17, wherein the predicate node represents the spatial relationship between the first image object and the second image object using a spatial preposition.

20. The one or more non-transitory computer storage media of claim 17, wherein the semantic computation graph comprises an object node that represents the first image object and stores or identifies a plurality of hypernyms or synonyms of the first image object.

* * * * *